United States Patent Office 3,038,074
Patented June 5, 1962

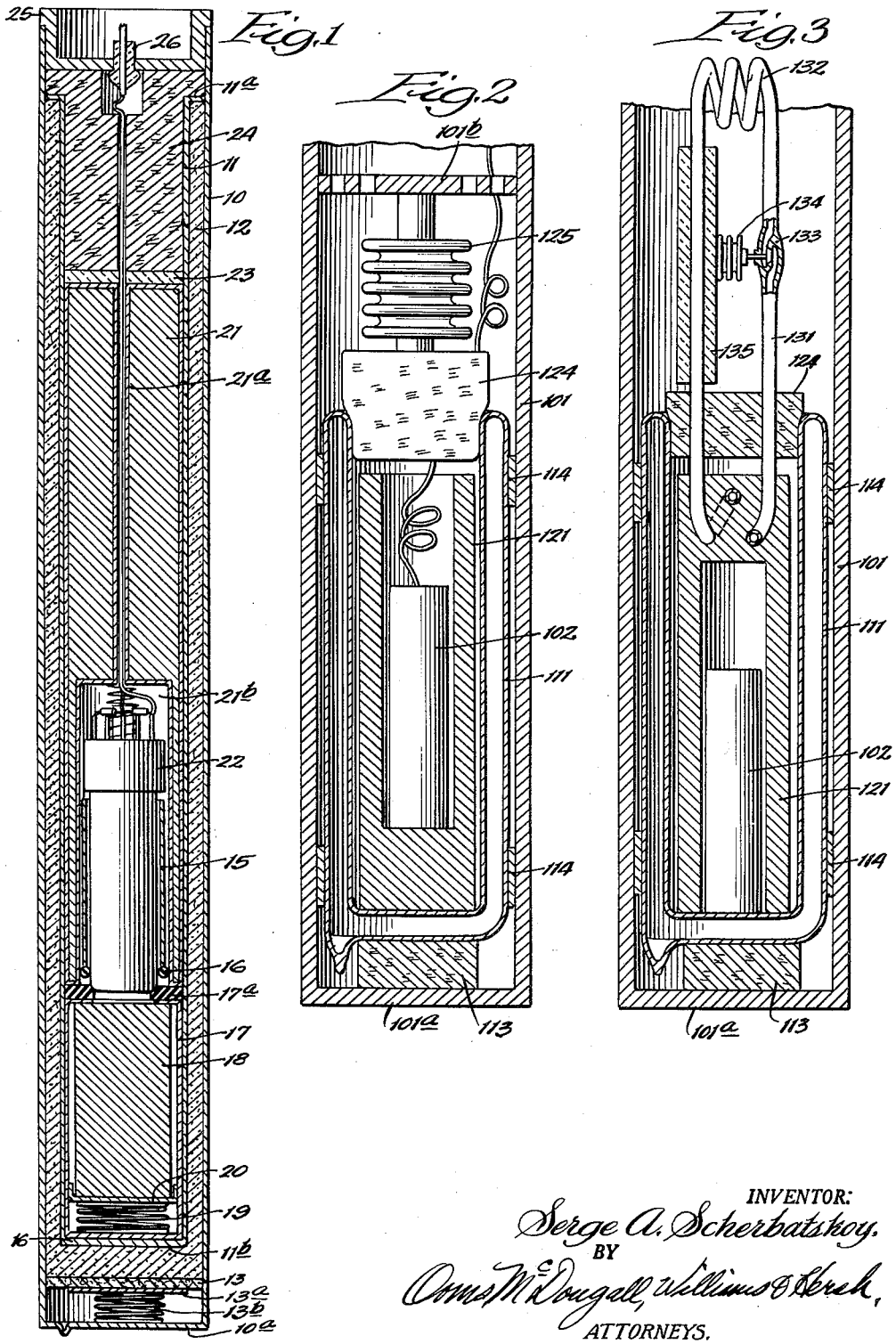

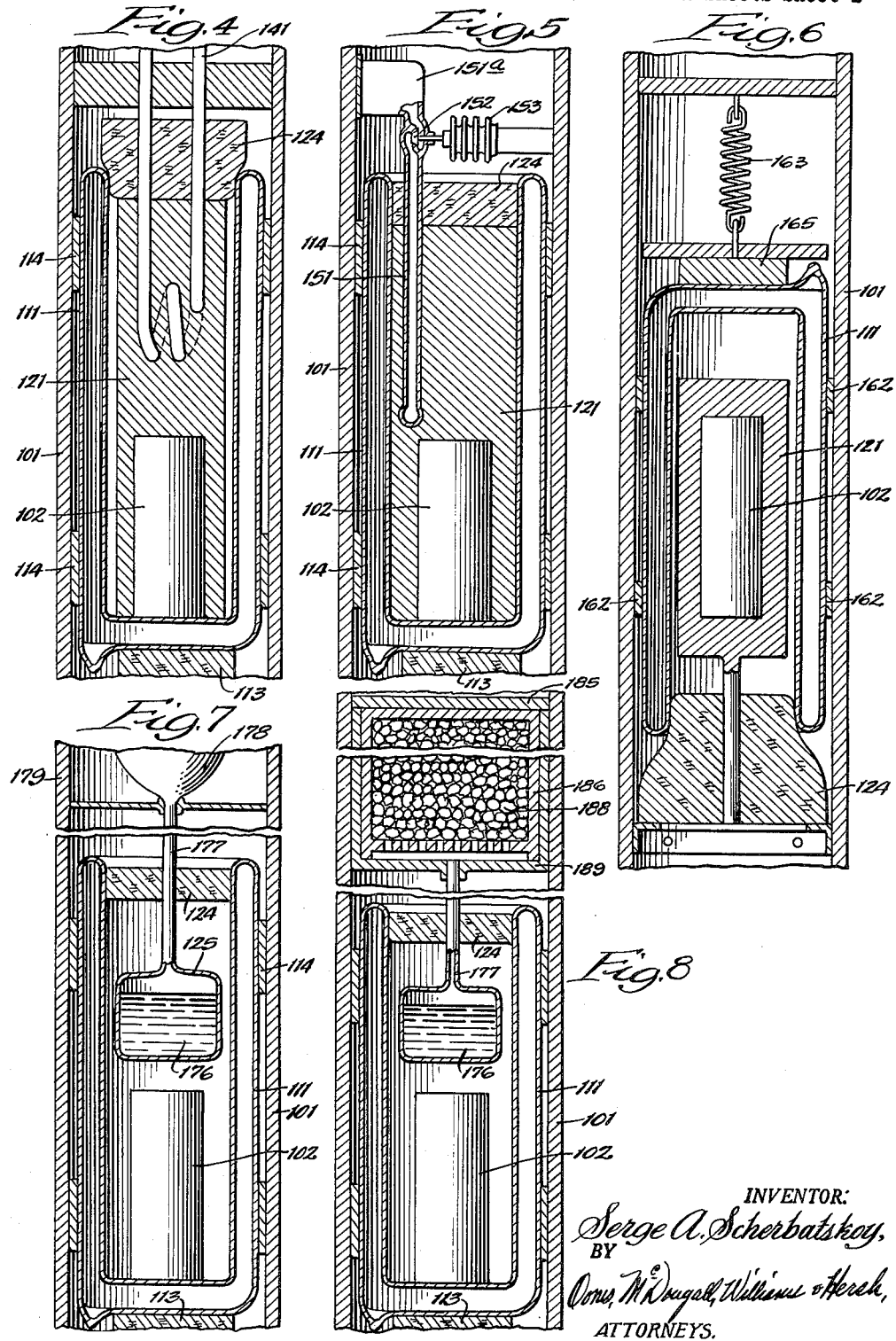

3,038,074
TEMPERATURE-REGULATED WELL-LOGGING APPARATUS
Serge A. Scherbatskoy, 1220 E. 21st Place, Tulsa 14, Okla.
Filed Nov. 6, 1959, Ser. No. 851,376
4 Claims. (Cl. 250—83)

This invention relates broadly to the field of radiation counters; in particular, it concerns temperature-regulated apparatus especially adapted for use in deepwell logging. The present specification is a continuation-in-part of my co-pending application Serial No. 395,558, filed December 1, 1953, now abandoned.

The use of a radiation counter as a means of assaying the geology of the formations traversed by a bore hole is well known in the art. The temperature encountered in deep wells is almost invariably far above outside atmospheric temperature and, in some instances, may rise to 375° F. or more. Such temperatures—far above the boiling point of water—very substantially affect the operation of all types of radiation-detecting apparatus, and, in some instances, will render the apparatus wholly inoperative.

In the past, various expedients have been resorted to as a means of protecting well-logging apparatus from excessive temperature, such as the use of ice.

The present invention provides a combination including a radiation counter which automatically maintains a safe, substantially constant temperature in the zone containing the radiation counter and any electronic components incidental thereto. This result is accomplished in optimum embodiments of the present invention by combining with the radiation counter a housing therefor comprising a double-walled heat-insulating jacket having a sealed space between the walls which is filled with a finely divided solid material of remarkable mechanical and heat-insulating properties. Within the interior of the jacket, along with the radiation counter itself, I preferably include a substantial mass of a material undergoing a reversible heat-absorbing physical change of state or a similar reversible chemical change at a temperature substantially above ordinary atmospheric temperature but at the same time well within the operating range of the radiation counter. Melting is such a suitable change of state, and one class of materials useful in my invention are those materials which melt at temperatures in the neighborhood of 100° F. Of course, any such material is, in general, more desirable for use in my invention if it possesses a high latent heat of liquefaction.

In addition to employing materials which melt at a convenient temperature, my invention can be used with many other classes of temperature-regulating substances. Liquids which vaporize in the desired temperature range can be employed, and, in addition, a number of interesting chemical reactions may be employed as a means of absorbing large quantities of heat. One such reaction, for example, is loss and recapture of water of crystallization.

In operation, the apparatus is lowered into the well with the temperature-sensitive material in the condition characteristic of normal atmospheric temperature. As the instrument is lowered in the well and the ambient temperature surrounding the instrument increases, heat will gradually leak into the zone within the insulated jacket, and the temperature of that zone will increase rather rapidly until that temperature is reached at which the change of state commences to occur. Thus, for example, a temperature-sensitive material may be chosen which melts at a temperature in the neighborhood of 100° F. Once such melting, or other change of state, has commenced, the temperature within the insulated zone will not increase appreciably until sufficient heat has been absorbed to melt, or otherwise alter the state of, nearly all the temperature-sensitive material. Given good heat insulation and proper choice of the quantity of temperature-sensitive material, melting will not be completed for several hours, even when the outside temperature is in the neighborhood of 375° F. Thus the radiation-detecting apparatus, carried within the insulated zone, in my invention is held at a moderate and substantially constant temperature throughout the entire logging operation.

Upon being removed from the well and restored to an environment of normal atmospheric temperature, heat will of course being to escape from the housing of my invention. Generally speaking, the rate of heat escape will be substantially slower than the rate of heat ingress, since the temperature difference between the melting point of the temperature-sensitive material and the atmosphere is usually much less than the temperature difference between the aforesaid melting point and the local temperature encountered in a deep well. Thus complete restoration of the temperature-sensitive material to its normal state may require a much longer time than the interval during which the instrument was located in the well. In some cases, such long cooling-off periods are not inconvenient, since well-logging equipment may be in actual use in the hot section of a well only a small fraction of the time.

In many applications, however, it may be necessary to operate the equipment so much as to leave insufficient time for cooling between logging operations. This may be particularly true when the apparatus is being used in a hot climate, wherein the ambient surface temperature, even at night, is near 100° F. For such situations, I have provided, as part of my invention, means for changing the rate of heat interchange between the insulated zone and the outside air, so as to cause the instrument to heat up slowly when the environment is at an elevated temperature and to cool off rapidly when the environment is at normal atmospheric temperature.

In view of the foregoing, it may accordingly be seen that a major object of the present invention is to provide well-logging apparatus comprising a radiation counter, having means for protecting the counter apparatus from exposure to excessive temperatures, even though the apparatus be employed in wells having local temperatures in the neighborhood of 375° F.

Radiation counters in general are substantially affected by changes in temperature. Even when the temperature does not exceed the value at which they will operate successfully, the counter characteristics, nonetheless, are likely to change as the temperature is altered. Thus, for example, in apparatus employing a photo-multiplier tube, the magnitude of the so-called "dark-current pulses" is greatly affected by temperature changes. In prior-art devices, elaborate electronic compensating devices have usually been required to achieve accurate logging of formation. With the present invention, the operating temperature of the radiation-sensitive apparatus is held substantially constant within narrow limits and such electronic compensation equipment is thus unnecessary.

Thus, a further object of my invention is to provide well-logging apparatus wherein the radiation-sensitive equpment is maintained at a substantially constant temperature substantially throughout the logging operation, the sensitivity and operating characteristic of the radiation counter being thereby held constant.

Another object of the invention is to provide a logging unit in which a double-walled heat-insulated zone is provided as a housing for the detector apparatus, such housing comprising a finely divided filler material packed between the evacuated inner and outer walls of the housing, possessing remarkable heat-insulating properties and at the same time giving to the double-walled housing a surprising degree of mechanical strength.

An additional object of the present invention is to provide, in a well-logging apparatus comprising a radiation counter, effective temperature control which includes means whereby the rate of heat exchange between an insulated zone and the outside environment is varied as a function of the ambient temperature.

More specifically, it is an object of the present invention to provide, in combination with a radiation detector and a temperature-sensitive, heat-absorbing material, means for permitting rapid heat exchange between the material and the outside environment when the ambient temperature is below a critical value while affording effective heat insulation for such material when the ambient temperature is above such critical value.

In the particular detailed embodiments of my invention which are shown in the appended drawing and more fully described in the following paragraphs, I have disclosed apparatus employing the type of radiation counter commonly known as a "scintillation counter." Such devices normally employ a suitable scintillating crystal, such as anthracene, in combination with a photo-multiplier tube.

Scintillation counters have come into extensive use in the last few years and are in many respects far superior to the older types of radiation counters. The mode of operation, briefly, is as follows: When a nuclear particle strikes the crystal, a minute flash of light is produced. The flash duration is extremely short, being of the order of $10^{-8}$ seconds. The light given off by the crystal impinges on the photocathode of the photo-multiplier tube and causes the emission of one or more electrons. Such electron or electrons are accelerated by an electric field and caused to strike the first dynode of the photo-multiplier, the collision resulting in emission of a substantially greater number of electrons. These in turn are accelerated toward the second dynode, and the resutling collision produces a still greater volume of electrons. This procedure may be repeated several times, depending upon the number of stages in the particular photo-multiplier tube being used. The result, in any event, is a brief current pulse in the output circuit of the photo-multiplier tube, the current being enormously large by comparison to the minute electron flow resulting from the initial light flash.

The pulses provided in the output circuit of the photo-multiplier tube can be further amplified by conventional means and used to operate any desired type of counter or indicator device.

Scintillation counters can be made far more sensitive per unit of volume than the older types of radiation counters dependent on gas ionization. Furthermore, the recovery of a scintillation counter after a pulse is so rapid that, unlike the older devices, a scintillation counter is capable of distinguishing nuclear events differing in time by only a few billionths of a second.

As to temperature, however, the scintillation counter is more demanding than the older radiation detectors. This arises partially from changes in crystal behavior as a function of temperature, but the primary reason for the scintillation counter's temperature sensitivity is the tendency of the photo-multiplier to emit spurious pulses (the so-called "dark current").

Even at very low temperatures, the photocathode of a photo-multiplier tube will emit a certain number of pulses due to thermionic emission. And the number of such spurious pulses increases very rapidly as the temperature of the tube goes up. Increasing temperature causes both the number and the average amplitude of the spurious pulses to increase. To prevent spurious pulses from affecting the accuracy of radiation data supplied by a counter, the instrument must normally be adjusted to have a threshold at least slightly above the level of the thermal or spurious pulses. But an increase in the operating temperature, after adjustment, will raise the level of the spurious pulses and thus cause them to rise above the threshold level, thus appearing in the counter output and spoiling the accuracy of the instrument. Thus successful use of a scintillation counter requires that the maximum operating temperature be held at or below the predetermined temperature for which the instrument's threshold value has been adjusted.

Thus, while any type of radiation counter is affected by high temperatures, avoidance of such temperatures is essential when a scintillation counter is used. It is accordingly another object of the present invention to provide a well-logging apparatus comprising in combination a scintillating crystal, a photo-multiplier tube, and a substantial mass of a temperature-sensitive material, all enclosed within a heat-insulating jacket, effective to maintain the operating temperature of the crystal and photo-multiplier at a predetermined temperature in the neighborhood of 100° F. even during several hours of sustained well-logging operations, without the necessity for any electronic temperature-control means.

Still other objects and novel results of my invention will appear in the course of the description which follows.

In the appended drawing, I have shown in FIGURE 1 a basic embodiment of my invention, comprising a scintillating crystal, a photo-multiplier tube, and a suitable heat-absorbing material enclosed in combination within a heat-insulating casing, FIG. 1 being a semi-diagrammatic view in axial section. FIG. 2 is a similar view showing another embodiment of my invention wherein means are provided for varying the rate of heat interchange between the insulated zone and the outer atmosphere, responsively to changes in the ambient temperature. FIGS. 3, 4 and 5 are diagrammatic sectional views of other, alternative arrangements for providing variation of rate of heat interchange as a function of ambient temperature. FIG. 6 shows diagrammatically in section a form of the invention wherein means are provided for making the rate of heat interchange between the outer environment and the heat-insulated zone dependent upon the position of the apparatus, the rate of heat interchange being lowest when the instrument is in the vertical position in which it is normally used in well logging. FIGS. 7 and 8 are diagrammatic sectional views showing forms of the invention wherein a vaporizing liquid is employed as a temperature-sensitive material.

Referring now to FIG. 1, I show therein an outer housing or casing 10 of cylindrical shape and provided with a suitable closure 10a. Casing 10 is preferably made of steel or other metal having considerable mechanical strength and ability to withstand without damage the high temperatures commonly encountered in deep wells.

Carried coaxially within housing 10 is an inner cylinder 11, which may also be made of steel or other metal, cylinder 11 being of smaller diameter than the outer housing 10 and being sealed, as by welding, to the bottom plate 10a. Inner cylinder 11 is also provided with an outwardly extending flange 11a at its upper end, flange 11a being sealed to the inner wall of housing 10 around its entire periphery, to provide a closed, sealed volume between outer housing 10 and inner cylinder 11. The sealed-off space between housing 10 and inner cylinder 11 is preferably evacuated. Further, I have found it highly desirable that the space between cylinders 10 and 11, in addition to being evacuated, be loosely filled with some such opaque material as granules 12. The details of the composition of granules 12 and the manner in which they are prepared and packed in the space between cylinders 10 and 11 are set forth in later paragraphs hereof.

The vacuum chamber defined by cylinders 10 and 11 extends to include the bottom portion of the housing beneath the bottom 11b of inner cylinder 11. I prefer to use a glass wool filter 13 to prevent the granules 12 from escaping during the evacuation of the vacuum chamber;

filter 13 is urged against the mass of granules by follower plate 13a, which is in turn held in position by spring 13b, seated on the bottom 10a.

Carried within the cylinder 11 immediately above bottom portion 11b is a container or mounting 17 wherein scintillating crystal 18 is carried. Container 17 is open at its upper end, being provided, however, with an annular flange 17a serving as a shoulder or stop against which crystal 18 abuts. Crystal 18 is urged upward against flange 17a by means of a spring 19 which is seated between the bottom of container 17 and the under surface of follower 20, which in turn presses upward on the under face of crystal 18.

Crystal 18 may be formed of any of the numerous materials commonly used in scintillation counters. Many such crystals are known; anthracene is perhaps most commonly used. Many suitable crystal materials are identified in the pertinent literature.

Carried within the interior of inner cylinder 11 is a cartridge 21 generally cylindrical in shape but having a central aperture 21a which is enlarged near its lower end to provide a rather sizable axial cylindrical recess 21b. A photo-multiplier tube 22 is mounted within recess 21b. It is mounted with its photocathode end facing the upper surface of crystal 18, so that light rays given off by the crystal 18 will impinge upon the photocathode of photo-multiplier 22. Tube 22 may be provided with a metal shield 15, and a suitable spacer ring 16 may be provided if desired.

The wires by means of which the operating voltages are applied to tube 22 and on which the output signal is carried pass out of recess 21b through the axial aperture 21a in cartridge 21.

Above cartridge 21 I provide a heat-isulating follower 23, above which is carried a cylindrical cork plug 24, cork 24 having a central aperture to carry the wires from tube 22. It will be understood that, in order to minimize heat loss therethrough, the wire-carrying apertures in follower 23 and cork 24 will be no larger than necessary.

The whole assembly is tightly secured in an integral unit by means of a seal member 25 which may be press-fitted or otherwise tightly secured in the upper end of housing 10, bearing down against the upper surface of cork insulator 24. Member 25 is of course also provided with a suitable means 26 for bringing out the wires from photo-multiplier tube 22.

The cartridge 21 is hollow and filled with a material which undergoes a heat-absorbing change of state at a temperature in the neighborhood of 100° F. The simplest type of heat-absorbing reaction of that character is liquefaction, and I accordingly prefer to fill cartridge 21 with a suitable material which is solid at ordinary atmospheric temperatures but which has the property of melting, with great absorption of heat, when its temperature reaches approximately 100° F. Many substances exist which satisfy the requirements of my invention, and I do not limit myself to any particular material for the purpose. For illustration, however, I have listed below several compounds which I have used with success as the contents of cartridge 21:

| Material | Melting temp. ° F. | Latent heat of liquefaction (calories per gram) |
|---|---|---|
| $Na_2SO_410H_2O$ | 88 | 51 |
| $Na_2HPO_412H_2O$ | 97 | 67 |
| $C_{16}H_{33}OH$ | 116 | 29 |
| $(COOCH_3)_2$ | 120 | 42 |
| $C_{10}H_{13}ON$ | 126 | 24.1 |

The objective to be attained in selecting a suitable heat-regulating compound is to secure the maximum latent heat of liquefaction per unit of volume, so that the density of the material is important as well as its latent heat per gram. Several of the compounds listed have densities substantially above that of water;

$$Na_2HPO_412H_2O$$

for example, has a density of about 1.5 grams per cc. Thus that material has a latent heat per cc. of more than 100 calories, substantially greater than that of water. In general, it is desirable that a material be chosen which has a latent heat of at least 50 calories per cc.

Hereinafter, for convenience, I shall refer generally to the material packed within the heat-insulated zone in the various embodiments of my invention as "temperature-regulating material," it being understood that that expression is employed to refer broadly to any of the substances possessing the quality of undergoing a heat-absorbing chemical or physical change of state at a temperature in the neighborhood of 100° F., that is, a few degrees above ordinary atmospheric temperatures. Normally, I prefer that the temperature-regulating material employed in my invention be one which undergoes a reversible reaction such that it gradually experiences a change of state when its temperature is raised to a critical value and then returns to its normal state spontaneously as its temperature drops below the critical value. Melting is an almost ideal example of such a reaction. I do not, however, limit my invention to any particular type of reaction or change of state.

I shall now describe in some detail the composition of granules 12 and the manner in which they are prepared and packed between cylinders 10 and 11, such features being important parts of my invention in its most preferred embodiments.

The design of a heat-insulating vacuum flask for housing a scintillation counter for well logging presents rather special problems. The instrument necessarily must be of small diameter and in order to accommodate the volume of the scintillation counter and the heat storage apparatus the assembly necessarily is very long. A typical scintillation counter for well logging embodying the principles of this invention is housed in a heat-insulating flask of .875" I.D., 1.4375" O.D., and 41.75" long. In order to provide material of sufficient strength to withstand the severe shocks that accompany well logging service the metal, glass, or other material making up the inner wall and the outer wall of these concentric tubes must be reasonably thick and therefore the clearance between the inner tube and outer tube is small.

The weight of the heat storage material is inherently large, and it has been found necessary to support the inner tube in order to maintain reasonable concentricity. A single support at one end is not sufficient and a number of supports must be provided. Each support of course is a conductor of heat and the quality of the thermal insulation is very severely affected by the multiple supports.

In my invention I have devised a method of supporting the inner tube and prevention of the passage of radiant heat energy which has produced unusually good results. The manufacture of the jacket is relatively easy and inexpensive and the heat-insulating properties are very good. Generally, my method consists in filling the annular space between the two tubes with a material which can be compacted so as to provide good support along the whole length of the tubes, such packing material being chosen so as to be opaque to heat radiation and to have low thermal conductivity.

I have found that a suitable material is powdered carbon in certain specific forms and with certain specific additives. Carbon itself in solid form has low heat conductivity at low temperatures, and certain charcoals, when suitably mixed, provide excellent results. An important consideration in the design of this supporting and insulating material is that it consists of minute granules having sharp edges so that when these granules are packed tightly (in order to provide strong support for the inner tube) each granule touches the adjacent granule at very few places and with very small area of contact.

I have found that a mixture of ⅓ by volume "Santocell" (manufactured by Monsanto Chemical Company) and ⅔ bone charcoal of 200 mesh provides good characteristics. Another substance which provides good results is approximately ½ (by volume) cocoanut charcoal of 50 to 200 mesh and ½ wood powdered charcoal of 500 mesh or finer. However, the best results I have obtained are with a mixture consisting of ⅓ (by volume) finely ground natural mica (100 mesh), ⅓ fine bone charcoal (necessary in order to give the substance its black color and make it opaque to heat radiation), and ⅓ diatomite of about 100 mesh.

The requirements for the material are somewhat conflicting; i.e., it is desirable that it be quite porous and that the area of contact between granules be very small. It is also desired that the material be well compacted and strong in order to support the inner tube. I have conducted many experiments in order to determine the optimum combination of properties.

After the material described above is packed into the annulus it is necessary to de-gas it since the materials as described above have enormous surface area. Because of the multiple granules, large amounts of gas and water are adsorbed into the surfaces. The material therefore must be processed for a long time at high vacuum at high temperature. For this processing the materials hereinabove are mixed so as to have a thorough homogeneity of composition. The materials are then placed in open trays and baked at slightly elevated temperature (about 150° C.) 4 or 5 hours. The material is then poured into the annular space between the inner and outer tubes a small amount at a time and thoroughly packed. It is desirable to have the tube preheated and remain warm so that new moisture will not be adsorbed to any great extent.

When the annular space is thoroughly filled with compacted material, the annular space is sealed off by being welded shut, and the space is evacuated (through a conventional glass-metal seal) at room temperature. The evacuation continues at room temperature until about 10 microns of pressure is achieved. The entire tube is then placed in an oven and the temperature gradually raised. It is important that the raising of the temperature be very slow so that at no time during the evacuation will the pressure exceed about 30 microns. This process is continued until the temperature is raised to 700° F., at which time the temperature is maintained at this value and evacuation continues until the pressure is reduced to .05 micron.

After many hours of such processing the instrument is then allowed to rest and breathe for a period of about one month, after which a second period of processing again lasting many hours at high temperature and high vacuum is necessary. The instrument can then be put into service.

In discussing the operation of the embodiment of FIG. 1, I shall assume, for illustrative purposes, that the vacuum flask has been prepared as just described and that cartridge 21 has been filled with the compound $Na_2HPO_4 12H_2O$, a solid at ordinary atmospheric temperatures. That compound melts at 97° F., has a latent heat of liquefaction of 67 calories per gram, and a density of approximately 1.5.

In the operation of the FIG. 1 form of the invention, the instrument is lowered into the bore hole as is conventional in well logging. As the instrument reaches the hot portion of the well, where the ambient temperature may be upwards of 300° F., heat will of course begin to flow into the interior of the instrument. Heat leakage will allow the interior of the vacuum chamber to rise in temperature fairly rapidly until it reaches the melting temperature of the compound, which, in the example under consideration, is approximately 97° F. When that temperature is reached in the insulated zone within inner cylinder 11, additional influx of heat does not increase the temperature further but instead is absorbed by the compound within cartridge 21. That material will gradually become liquid as additional heat leaks through into the insulated zone from the hot outside environment. So long as any portion of the material in cartridge 21 is still solid, however, practically no increase in temperature within the insulated zone will take place.

As a result of this action, the photo-multiplier tube 22 and the crystal 18 will operate through the logging cycle at a substantially constant, standard temperature. The instrument can be adjusted in advance for optimum operation at that temperature. The instrument similarly works satisfactorily during the preliminary warm-up period, prior to stabilization of the inside temperature at 97° F., since (a) the counter operation is not affected seriously by lower-than-normal temperatures, and (b) the preliminary temperature change is in any case a small one, usually less than 30° F.

Determination of the size of cartridge 21 is of course a matter of design, depending on the normal length of exposure of the instrument to high ambient temperatures and depending also on the rate of heat leakage into the insulated zone while the instrument is exposed to high ambient temperatures. Normally no logging operation will consume more than a few hours, and cartridge 21 can easily be designed to accommodate sufficient temperature-regulating material to keep the internal temperature of the instrument at the desired value for such a period. No harm results, of course, from the use of a larger cartridge 21 than necessary; it is important, however, to make cartridge 21 sufficiently large to insure that some of the temperature-regulating material will remain in solid state, even after a long logging operation.

Upon completion of the logging operation, the instrument is withdrawn from the bore hole, and thus restored to the usual ambient atmospheric temperature. At once, heat will begin to flow in the opposite direction, that is, heat will leak from the interior of the insulated zone into the outer air. This process, however, will in the FIG. 1 embodiment of the invention take place more slowly than the heating-up phase of the operation, since the temperature differential between the interior of the insulated zone and the outer air is very much less than the differential of temperature existing between the hot bore hole and the interior of the insulated zone. In the first case, the temperature differential will normally be only 25° to 30° F., while in the latter case it will usually be in the neighborhood of 200° F.

In many applications it is essential that the instrument be ready for re-use in logging within a short time after being withdrawn from the bore hole. I have, in FIGS. 2-6, disclosed diagrammatically various modifications of my invention for making this possible.

FIG. 2 and all the succeeding figures are more diagrammatic than FIG. 1, being intended simply to bring out various modifications of the basic invention. In FIG. 2, I show a metal casing 101 adapted to receive the necessary radiation-counter components and to protect them against mechanical injury. Housing 101 is provided with a bottom surface 101a and a top element 101b, which may be pressed or otherwise secured in position.

The essential components of the radiation counter including a scintillation crystal and a photo-multiplier tube are diagrammatically shown as a single container 102. Container 102 is carried within a diagrammatically indicated cartridge 121 which, in turn, is carried within a vacuum-insulated container similar to that already described in detail relative to FIG. 1. This container, diagrammatically represented in FIGS. 2–8 as flash 111, is preferably provided with granules as already described, packed between its inner and outer walls.

A cork 124 serves as a closure for the flask 111, cork 124 being anchored to thermostatic bellows 125, the other end of which is anchored on cover 101b.

In the operation of FIG. 2, exposure of the instrument to high ambient temperatures causes bellows 125 to expand and thereby to force the cork 124 tightly into the opening of vacuum flask 111. On the other hand, when the instrument is above ground and exposed to the usual atmospheric temperature, the bellows 125 will contract sharply and pull cork 124 out of its position of tight seating in the upper end of vacuum flask 111. Thus the flow of air into and out of the interior of bottle 111 is controlled by the ambient temperature, the flow of heat being enormously greater for a given temperature differential when the ahmbient temperature is high than when it is low.

In FIG. 3 I have shown a structure comprising casing 101, vacuum-insulated container 111 and scintillation counter 102, as in FIG. 2. In the FIG. 3 form of the invention, however, the cork 124 is permanently positioned to form a tight seal at the top of the vacuum chamber, being, however, pierced with the necessary apertures for permitting passage of the electric wires (not shown) and also provided with a pair of apertures through which the tubes of a continous conduit 131 pass. The portion of conduit 131 inside the heat-insulated chamber passes through the cartridge 121 and is hence in intimate heat-exchange relation with the temperature-regulating material packed therein. Similarly, the outer portion of conduit 131 comprises a heat-exchange coil 132 which is at all times in heat-exchange relation with the outside air. Conduit 131 is provided, at any convenient point in its length, with a valve 133, operated by a bellows thermostat 134, mounted on any convenient bracket (not shown).

The continuous conduit 131 may be filled with any suitable heat-transfer liquid such as ethylene glycol. Whenever valve 133 is open, the liquid within conduit 131 circulates by thermo-siphon action and thus achieves rapid heat exchange between the outside air and the interior of the vacuum bottle 111. When the ambient temperature rises, however, as by lowering of the instrument into a hot well, thermostat 134 closes the valve 133 and thus prevents further circulation of the ethylene glycol or other liquid. If desired, circulation of the liquid during cooling periods may be assisted by providing an insulating jacket 135 for one of the branches of conduit 131, thus assisting in maintaining one section of the conduit warmer than the other.

It will of course be understood that heat exchange with the interior of the vacuum chamber may readily be obtained during cooling periods by means of circulation of water or some other suitable cooling liquid. Such an arrangement is shown diagrammatically in FIG. 4. In that figure, the cartridge 121 and the scintillation-counter apparatus 102 are provided as in FIGS. 2 and 3, the elements being carried within vacuum container 111 and sealed by means of cork 124. A conduit 141 provides a means for heat exchange to the interior of cartridge 121 which contains the temperature-regulating material. Normally, the terminals of coil 141 may be sealed off, so that no significant amount of heat exchange takes place thereby. When the instrument is brought to the surface and prepared for cooling, however, any desired arrangement for circulating a heat-exchange liquid through conduit 141 may be provided, resulting in very rapid cooling of cartridge 121 and re-solidification of the temperature-regulating material therein contained.

FIG. 5 shows an arrangement closely akin to that of FIG. 3, except that the continuous conduit 131 of FIG. 3 is replaced by a super-conductive cooling rod 151. Rods of that type, of which a typical one is manufactured by Condor Radio Manufacturing Company of Tucson, Arizona, contain a liquid which vaporizes in the presence of heat, rises to the bulb end 151a of the instrument, there reliquefies with great loss of heat, and flows back again to the bottom of the tube. Such devices have an effective heat conductivity many times greater than that of silver, the most conductive metal.

As with the FIG. 3 arrangement, I provide in FIG. 5 a valve 152 and a bellows thermostat 153, by means of which the heat-transfer action of rod 151 is arrested when the ambient temperature is higher than the melting point of the temperature-regulating material in cartridge 121.

FIG. 6 shows another alternative arrangement in which cooling of the instrument may be speeded up by gravity-controlled means. In FIG. 6, the sealing cork 124 is fixedly disposed at the bottom portion of the casing 101, the cartridge 121 and scintillation-counter apparatus 102 being fixedly mounted with respect to cork 124 along the axis of the casing 101. Vacuum bottle 111 is slidably carried within the casing, suitable guides 162 being provided therefor to hold it against lateral movement. The vacuum bottle 111 is suspended from the top of casing 101 by means of a spring 163.

The instrument is invariably in a vertical position, with cork 124 downward, when being used in a logging operation. At such times, the vacuum bottle 111 is urged downward onto sealing cork 124 by gravity operating on the bottle 111 and on the weight 165.

During periods above ground, however, when the instrument is cooling, it can be placed in a horizontal position or in a vertical position with cork 124 upward, at which time the vacuum bottle 111 will be pulled off of cork 124, thus breaking the seal and exposing cartridge 121 to free heat exchange with the outer air, greatly facilitating and speeding up cooling and resolidifying of the temperature-regulating material contained within it.

FIGS. 7 and 8 illustrate diagrammatically the manner in which my invention can be employed with a liquid heat-regulating material, as opposed to a normally solid material such as has been employed in the specific embodiments heretofore described.

In the embodiment of FIG. 7, I show a structure generally similar to that of the previous embodiments, being enclosed in casing 101 and comprising vacuum chamber 111, scintillation counter 102, and cork 124. In lieu of cartridge 121 containing a solid heat-regulating material, however, I show a receptacle 175 containing a quantity of liquid 176. The liquid 176 may be substantially any liquid which vaporizes at a temperature in the range under consideration, say about 100° F. Container 175 is connected by means of a conduit 177 to a balloon-like member 178 which is mounted outside the controlled-temperature zone within bottle 111 and which, for mechanical protection, may be surrounded by a housing or jacket 179. Generally speaking, the cubic volume of housing 179, and the maximum volume of expandable member 178 will be many times the volume of container 175, since liquids invariably increase tremendously in volume when they vaporize.

The operation of the structure of FIG. 7 will be readily apparent in the light of the operation of the other embodiments heretofore described. The instrument is introduced into the well, and as heat gradually leaks into the interior of the vacuum chamber 111, the liquid 176 will commence to vaporize. As the liquid vaporizes, the released vapors pass upward through conduit 177 and move into the expandable, balloon-like element 178. This procedure holds the temperature within vacuum chamber 111 substantially constant until all of the liquid 176 shall have vaporized. When the instrument is raised to the surface, the balloon-like member 178, having no heat insulation from the outside air, will quickly cool off, the vapor contained within it will reliquefy, and will promptly flow back into container 175.

Of course any other suitable type of expanding chamber may be substituted for the member 178.

FIG. 8 shows a modified form of FIG. 7 in which the expanding chamber 178 is replaced by a fixed-size chamber 189 within which is carried a removable cartridge 186 containing silica gel 188 or any of the other solid materials, of which many are well known, which have the property of absorbing large volumes of vapor. After a logging operation, cover plate 185 of chamber 189 can be removed and cartridge 186 replaced with a fresh cartridge. If it is preferred that a permanent cartridge of vapor-absorbing material be used, any desired means, such as a heat-exchange coil, may be built into the cartridge 186 to facilitate the driving off of vapors from the material during above-ground periods.

While I have in this specification described in some detail a number of separate embodiments of my invention, it is to be understood that such description was illustrative only. It is my desire that the scope of my invention be determined primarily with reference to the appended claims.

I claim:
1. Apparatus for logging of deep wells comprising means defining a heat-insulated zone, said means comprising a double-walled enclosure having a sealed-off space between such walls, such space being at least partially evacuated, an aggregated mass of granules, characterized by low thermal conductivity and high opacity to radiation, packed into such sealed-off space, said granules being smaller in size than about 50 mesh and having sharp edges and irregular shape, a sensing element for producing signals representative of a physical condition in a well, said sensing element having a characteristic range of operating temperatures, said range including the normal range of earth-surface temperatures and extending at least somewhat thereabove, and a substantial quantity of a material having the property of absorbing a large quantity of heat when subjected to environmental temperatures above its own temperature, thereby resisting temperature increase within said zone, said sensing element and said material being disposed within said heat-insulated zone.

2. The apparatus of claim 1 wherein said mass of granules comprises a mixture of wood charcoal and coconut charcoal.

3. The apparatus of claim 1 wherein said mass of granules comprises a mixture of charcoal and finely divided inorganic material.

4. The apparatus of claim 1 wherein said mass of granules comprises a mixture of approximately equal parts of natural mica, charcoal, and diatomite, ground to irregularly shaped, sharp-edged particles of about 50 mesh and smaller.

References Cited in the file of this patent
UNITED STATES PATENTS
2,862,106    Scherbatskoy _____ Nov. 25, 1958

UNITED STATES PATENT OFFICE
CERTIFICATE OF CORRECTION

Patent No. 3,038,074            June 5, 1962

Serge A. Scherbatskoy

It is hereby certified that error appears in the above numbered patent requiring correction and that the said Letters Patent should read as corrected below.

Column 2, line 13, for "being" read -- begin --; lines 56 and 57, for "formation" read -- formations --; column 8, line 72, for "flash" read -- flask --.

Signed and sealed this 25th day of September 1962.

(SEAL)
Attest:

ERNEST W. SWIDER            DAVID L. LADD
Attesting Officer            Commissioner of Patents